United States Patent
Itasaki et al.

(10) Patent No.: US 9,690,796 B2
(45) Date of Patent: Jun. 27, 2017

(54) NON-TRANSITORY COMPUTER-READABLE MEDIA STORING FILE MANAGEMENT PROGRAM, FILE MANAGEMENT APPARATUS, AND FILE MANAGEMENT METHOD

(71) Applicant: FUJITSU LIMITED, Kawasaki-shi, Kanagawa (JP)

(72) Inventors: Akira Itasaki, Yokohama (JP); Hirokazu Aritake, Atsugi (JP); Hiroyasu Sugano, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 401 days.

(21) Appl. No.: 14/314,137

(22) Filed: Jun. 25, 2014

(65) Prior Publication Data
US 2015/0032785 A1    Jan. 29, 2015

(30) Foreign Application Priority Data
Jul. 25, 2013    (JP) .................................. 2013-154891

(51) Int. Cl.
G06F 17/30    (2006.01)
H04L 29/08    (2006.01)

(52) U.S. Cl.
CPC ........ G06F 17/30106 (2013.01); H04L 67/06 (2013.01); H04L 67/10 (2013.01);
(Continued)

(58) Field of Classification Search
CPC ......... G06F 17/30575; G06F 17/30215; G06F 17/30581; G06F 17/30106
See application file for complete search history.

(56) References Cited

U.S. PATENT DOCUMENTS 6,374,336 B1 *  4/2002  Peters ................ G06F 11/1076
                                                   348/E5.008
8,458,379 B2 *  6/2013  Ueno ..................... H04L 67/32
                                                   710/15
(Continued)

FOREIGN PATENT DOCUMENTS

JP    07-295994    11/1995
JP    10-228477    8/1998
(Continued)

OTHER PUBLICATIONS

JPOA—Japanese Office Action mailed on Apr. 25, 2017 for corresponding Japanese Application No. 2013-154891, with machine translation.

*Primary Examiner* — Merilyn Nguyen
(74) *Attorney, Agent, or Firm* — Fujitsu Patent Center

(57) ABSTRACT

A non-transitory computer-readable storage medium that stores a file management program for causing a computer to execute a file management process including: transmitting a file search request based on a search condition from a currently operating information processing apparatus to a plurality of other information processing apparatuses, receiving file information searched by the respective other information processing apparatuses, and displaying the file information in the search result; selecting another information processing apparatus to be a transfer source out of a plurality of other information processing apparatuses that store a same file as a file which is selected from the search result, based on the transfer time of the selected file to the currently operating information processing apparatus; and requesting transfer of the selected file to the selected other information processing apparatus to be the transfer source, receiving the transferred selected file and displaying the selected file.

13 Claims, 18 Drawing Sheets

(52) U.S. Cl.
CPC ...... *H04L 67/1095* (2013.01); *H04L 67/1097* (2013.01); *G06F 17/30575* (2013.01)

(56) References Cited

U.S. PATENT DOCUMENTS

| | | |
|---|---|---|
| 9,129,217 B2 * | 9/2015 | Bevan |
| 2003/0182328 A1 * | 9/2003 | Paquette ........... G06F 17/30575 |
| 2008/0065587 A1 * | 3/2008 | Iwasaki ................. G06F 3/0614 |
| 2008/0228821 A1 * | 9/2008 | Mick ....................... G06F 21/10 |
| 2010/0250739 A1 * | 9/2010 | Murata ............... H04L 12/2602 |
| | | 709/224 |
| 2013/0110779 A1 * | 5/2013 | Taylor ............... G06F 17/30221 |
| | | 707/624 |
| 2013/0322842 A1 * | 12/2013 | Sakaguchi ............. H04N 5/445 |
| | | 386/230 |
| 2014/0344518 A1 * | 11/2014 | Kawaba ................ G06F 3/0613 |
| | | 711/114 |

FOREIGN PATENT DOCUMENTS

| | | |
|---|---|---|
| JP | 2002-244906 | 8/2002 |
| JP | 2002-278814 | 9/2002 |
| JP | 2004-102493 | 4/2004 |
| JP | 2006-107375 | 4/2006 |
| JP | 2008-15637 | 1/2008 |

* cited by examiner

FIG.4

| | MAIN_PC | NAS | NOTE_PC | S_PHONE | CLOUD |
|---|---|---|---|---|---|
| LOCAL FOLDER | C:/data/<br>PATENT DATA0.txt<br>PATENT DATA0_2.txt<br>PATENT DATA1.txt<br>PATENT DATA1_2.txt<br>PATENT DATA2.txt | backup/<br>20130305/<br>PATENT DATA0.txt<br>PATENT DATA0_2.txt<br>PATENT DATA1.txt<br>20130306/<br>PATENT DATA1_2.txt<br>PATENT DATA2.txt | C:/doc/<br>PATENT DATA3.txt<br>PATENT DATA4.txt | temp/<br>PATENT DATA2.txt<br>PATENT DATA2_2.txt<br>PATENT DATA2_3.txt<br>PATENT DATA3.txt | |
| SYNCHR-ONIZATION FOLDER | C:/sync/<br>PATENT DATA1.txt<br>PATENT DATA2.txt<br>PATENT DATA3.txt<br>PATENT DATA4.txt | sync/<br>PATENT DATA1.txt<br>PATENT DATA2.txt<br>PATENT DATA3.txt<br>PATENT DATA4.txt | C:/ sync/<br>PATENT DATA1.txt<br>PATENT DATA2.txt<br>PATENT DATA3.txt<br>PATENT DATA4.txt | -- | sync/<br>PATENT DATA1.txt<br>PATENT DATA2.txt<br>PATENT DATA3.txt<br>PATENT DATA4.txt |

FIG.5

| PATENT DATA0.txt main_PC/c/Data/ | PATENT DATA1.txt NAS/sync/ | PATENT DATA2.txt NAS/backup/20130306/ | PATENT DATA3.txt main_PC/c/sync/ | PATENT DATA4.txt NAS/sync/ |
|---|---|---|---|---|
| PATENT DATA0.txt NAS/backup/20130305/ | PATENT DATA1.txt note_PC/c/sync/ | PATENT DATA2.txt NAS/sync/ | PATENT DATA3.txt NAS/sync/ | PATENT DATA4.txt note_PC/c/doc/ |
| PATENT DATA0_2.txt main_PC/c/Data/ | PATENT DATA1.txt cloud/sync/ | PATENT DATA2.txt note_PC/sync/ | PATENT DATA3.txt note_PC/c/doc/ | PATENT DATA4.txt note_PC/sync/ |
| PATENT DATA0_2.txt NAS/backup/20130305/ | PATENT DATA1_2.txt main_PC/c/data/ | PATENT DATA2.txt phone/temp/ | PATENT DATA3.txt note_PC/sync/ | PATENT DATA4.txt cloud/sync/ |
| | PATENT DATA1_2.txt NAS/backup/20130306/ | PATENT DATA2.txt cloud/sync/ | PATENT DATA3.txt phone/temp/ | |
| PATENT DATA1.txt main_PC/c/Data/ | PATENT DATA2.txt main_PC/c/sync/ | PATENT DATA2_2.txt phone/temp/ | PATENT DATA3.txt cloud/sync/ | |
| PATENT DATA1.txt NAS/backup/20130305/ | PATENT DATA2.txt main_PC/c/sync/ | PATENT DATA2_3.txt phone/temp/ | PATENT DATA4.txt main_PC/c/sync/ | |

FIG.6

| PATENT DATA0.txt | PATENT DATA0_2.txt | PATENT DATA1.txt | PATENT DATA1_2.txt | PATENT DATA2.txt | PATENT DATA2_2.txt | PATENT DATA2_3.txt | PATENT DATA3.txt | PATENT DATA4.txt |

FIG.13

| S_PHONE | P-SAVE (sec) | AP1 (Mbps) | AP2 (Mbps) |
|---|---|---|---|
| MAIN_PC | 10 | 3 | 50 |
| NAS | 5 | 50 | 3 |
| NOTE_PC | 5 | 20 | 1 |
| CLOUD | – | 5 | 5 |

NON-TRANSITORY COMPUTER-READABLE MEDIA STORING FILE MANAGEMENT PROGRAM, FILE MANAGEMENT APPARATUS, AND FILE MANAGEMENT METHOD

CROSS-REFERENCE TO RELATED APPLICATION

This application is based upon and claims the benefit of priority of the prior Japanese Patent Application No. 2013-154891, filed on Jul. 25, 2013, the entire contents of which are incorporated herein by reference.

FIELD

The present invention relates to a file management program, a file management apparatus and a file management method.

BACKGROUND

In recent years, users operate a plurality of information processing apparatuses (hereafter called "a terminal" or "a terminal device"). For example, in addition to a main PC for business, a user usually carries a notebook PC, a smartphone, a tablet terminal or the like. And the user may use a backup service to create a backup file of a created or updated file, and a file synchronization service to share a same file with all the terminal devices. Therefore it is no longer rare for a plurality of same files to exist on a same terminal or a plurality of terminals.

Under this state, if a desired file is edited at a terminal, it is preferable that a file is searched among the plurality of terminals, an editing target file is selected from a file list detected by the file search, the selected file is transferred from the terminal storing this selected file to a terminal to edit the file, and then the file is displayed. It is also preferable that the original file is updated to the edited file.

The methods of searching files are disclosed in Japanese Patent Application Laid-open No. 2002-278814, Japanese Patent Application Laid-open No. 2008-15637 and Japanese Patent Application Laid-open No. 2006-107375.

SUMMARY

However, it is not easy to select a file since files detected in a file search include a plurality of the same overlapping files. Further, if a communication state of a terminal storing a selected file is poor, it takes time to transfer the file to the operating terminal in-use, which makes operation inefficient. Moreover, it takes time to update the original file after editing the file, depending on the communication state of the terminal storing the original file, which also lowers efficiency. Furthermore an error in which a backup file is updated may occur when updating the backup file, which is undesirable.

One aspect of the present embodiment is a non-transitory computer-readable storage medium that stores a file management program for causing a computer to execute a file management process comprising:

transmitting, in response to a file search request based on a search condition, a file search request based on the search condition from a currently operating information processing apparatus to a plurality of other information processing apparatuses, receiving file information searched by the respective other information processing apparatuses, and displaying the file information in the search result on the currently operating information processing apparatus;

selecting another information processing apparatus to be a transfer source out of a plurality of other information processing apparatuses that store a same file as a file which is selected from the search result, based on the transfer time of the selected file to the currently operating information processing apparatus; and requesting transfer of the selected file to the selected other information processing apparatus to be the transfer source, receiving the transferred selected file and displaying the selected file on the currently operating information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an example of a file group which is stored in each file storage of a plurality of terminal devices according to this embodiment.

FIG. 5 indicates a first search result.

FIG. 6 indicates a second search result.

FIG. 13 is a table used by the file management program to calculate the file transfer time.

DESCRIPTION OF EMBODIMENTS

Figure 1:
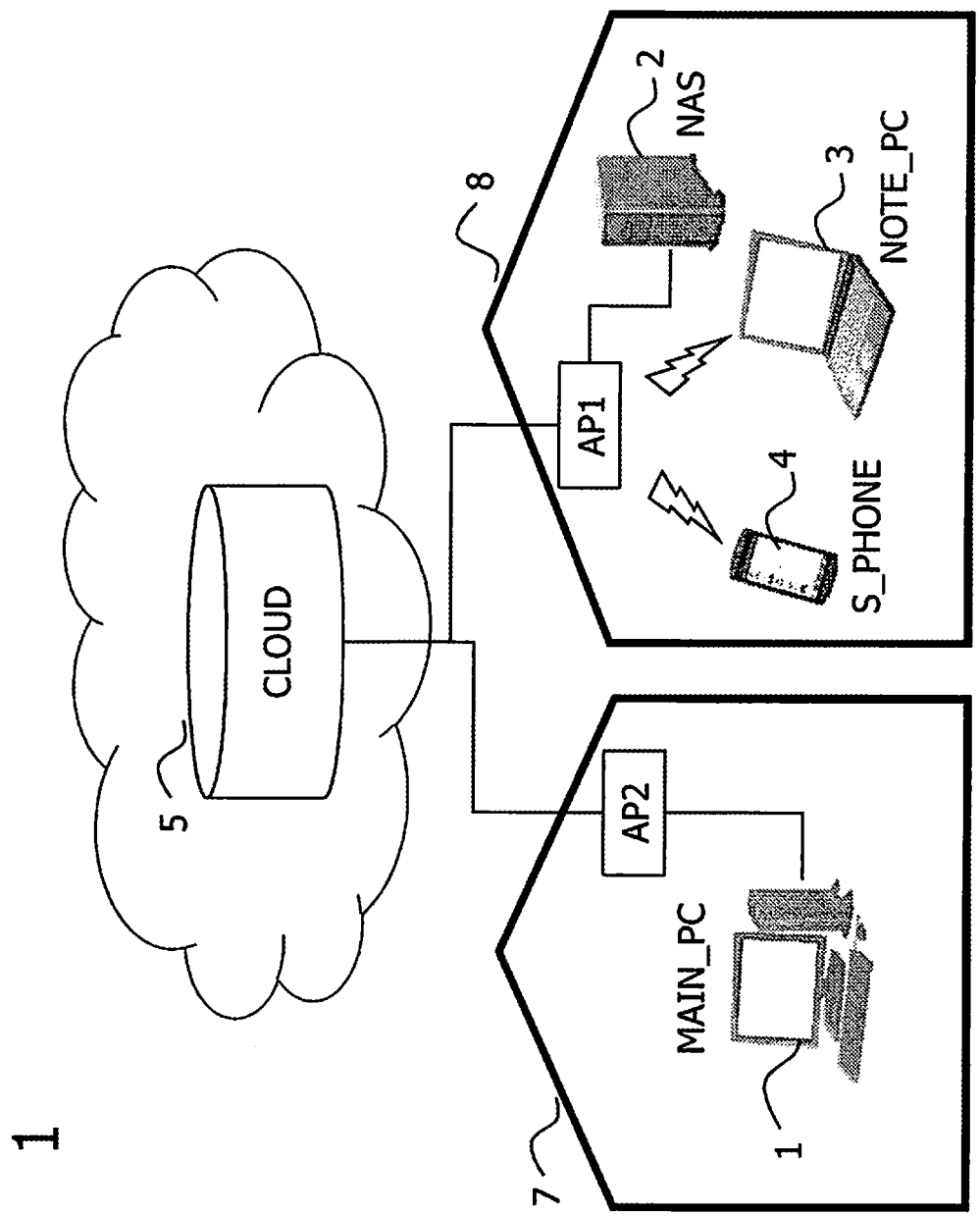
FIG. 1 illustrates an example of a plurality of information processing apparatuses according to this embodiment.

FIG. 1 illustrates an example of a plurality of information processing apparatuses according to this embodiment. A plurality of information processing apparatuses accessed by the user includes, for example, a main PC (Personal Computer) 1, a network attached storage (NAS) 2, a notebook PC 3, a smartphone 4 and a cloud server 5 disposed on a network. The main PC1 and the notebook PC3 store files, and display and edit files. The smartphone 4 as well stores files, and displays and edits files. The storage capacity of a smartphone 4 is not as large as the main PC 1. The NAS 2 has a large capacity storage, stores a large volume of files, and is used as a storage to store backup files. The cloud server 5, which the user is not able to operate, is used primarily as a storage to store files.

In the example in FIG. 1, the main PC 1 is installed inside a building 7, and is able to communicate with an external network via an access point AP 2. The notebook PC3, the NAS 2 and the smartphone 4 are installed or located inside a building 8, and are able to communicate with the external network via an access point AP 1. The notebook PC 3 and the smartphone 4 communicate with the access point AP 1 by radio, and the NAS 2 is connected to the access point AP 1 by cable.

In FIG. 1, the plurality of information processing apparatuses, such as the main PC, the NAS, the notebook PC, the smartphone and the cloud server are all communicably connected as terminals via the network. Hereafter the plurality of information processing apparatuses is simply called a "terminal" or a "terminal device".

Figure 2:
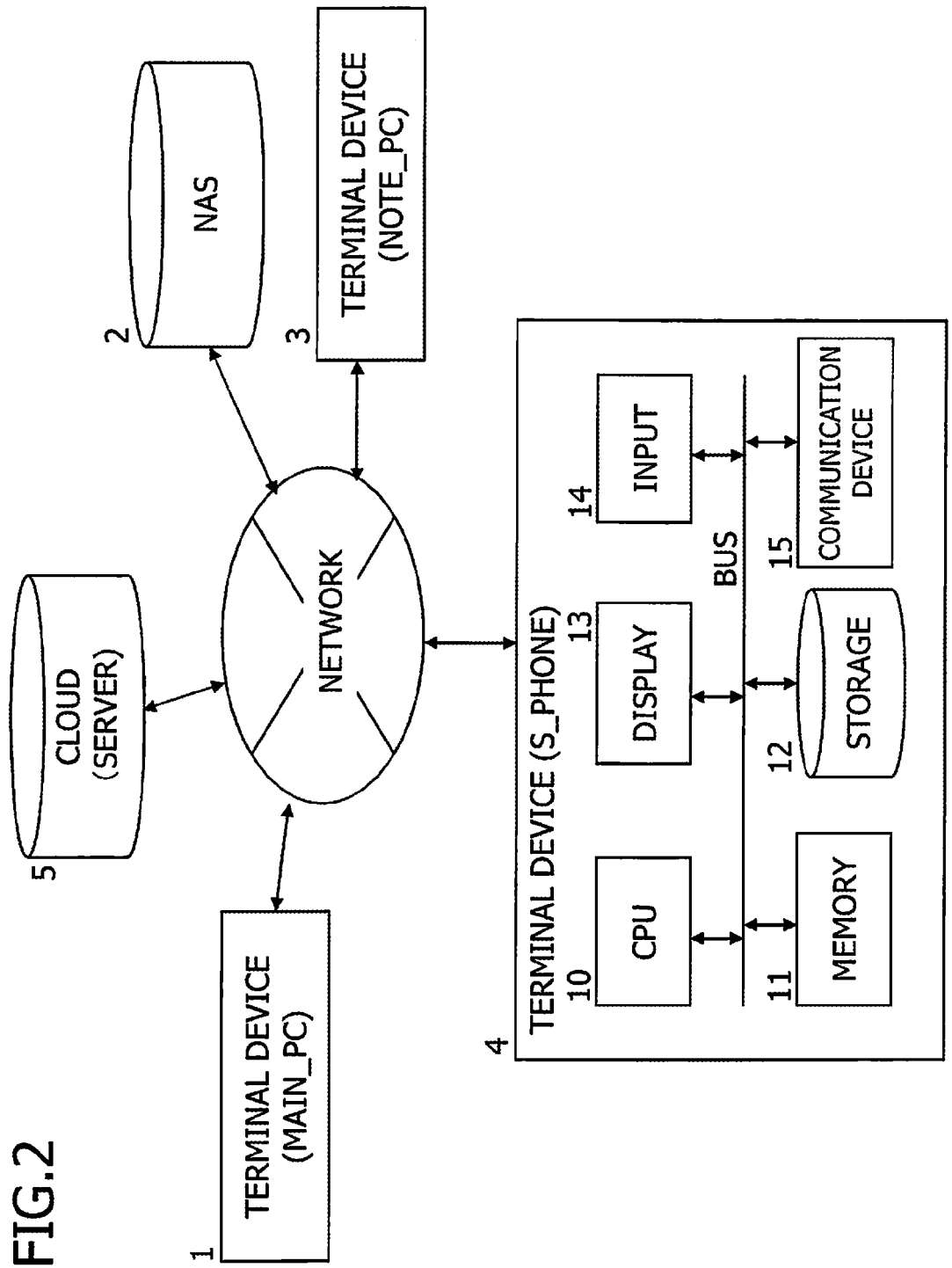
FIG. 2 illustrates a configuration of the plurality of terminal devices.

FIG. 2 illustrates a configuration of the plurality of terminal devices. All terminal devices 1 to 5 are communicably connected via a network. FIG. 2 also illustrates an example of a configuration of the smartphone 4. The smartphone 4 includes: a CPU 10 which is a processor; a memory 11 which is a RAM: a storage 12 which is a flash SSD or the like to store data, files and various programs; a display device 13; an input device 14 such as a touch panel; and a communication device 15, and these composing elements are connected via a bus BUS.

The main PC 1 and the network PC 3 also have configurations similar to the smartphone 4. The NAS 4 and the cloud server 5 also have configurations similar to the smartphone 4, but the storages 12 thereof have very large storage capacities.

Figure 3:
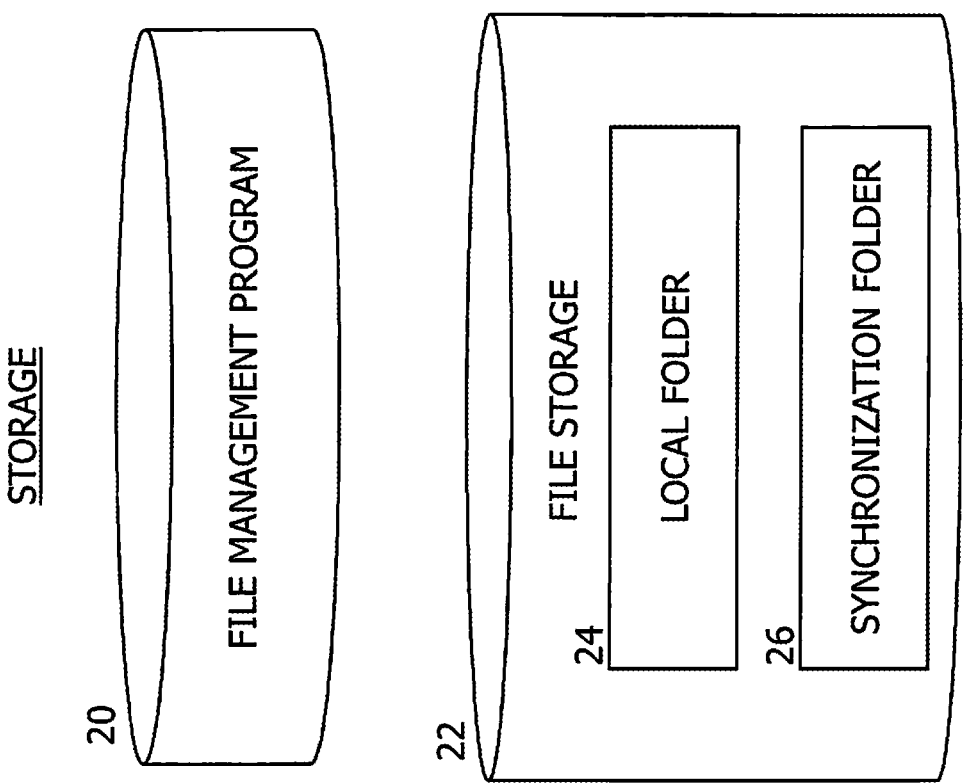
FIG. 3 illustrates a configuration example of the storage 12 of a plurality of terminal devices.

FIG. 3 illustrates a configuration example of the storage 12 of a plurality of terminal devices. The storage 12 houses a file management program 20 that by being executed by the processor 10 performs a file management process to manage files on a plurality of terminals, which are connectable via the network, and a file storage 22 for storing files. The functions of the file management program 20 will be described later.

The file storage 22 includes a local folder 24 that stores a plurality of files which the user refers to, edits and updates (overwrites and saves), and a synchronization folder 26 for storing synchronization files. In the local folder 24, a file on the local terminal or a backup file of a file on another terminal may be stored. In the synchronization folder 26, the same contents as a synchronization file in a synchronization folder on the cloud server 5, for example, are stored at a predetermined time at a predetermined frequency, although this depends on the synchronization service that is used.

FIG. 4 is an example of a file group which is stored in each file storage of a plurality of terminal devices according to this embodiment. In this example, the user creates and edits files using one terminal out of the main PC, the notebook PC and the smartphone. In this example, the user creates and edits files in the local folder of the terminal, and saves the file "Patent Data" under a new name, such as "Patent Data 0.txt", "Patent Data 0_2.txt", "Patent Data 1.txt" and "Patent Data 1_2.txt. It is further assumed that the user uses a synchronization service, which shares files using a synchronization folder between terminals, and sets up this service so that backup files of the files in the C:/Data/ folder of the main PC are backed up to the backup folder of NAS at a predetermined time.

In the example in FIG. 4, the user edits "Patent Data", which was originally created by the main PC, using the notebook PC or the smartphone. For example, it is assumed that the user performed the following operation.

(1) The user created the file "Patent Data 0.txt" on the main PC, saved "Patent Data 0_2.txt" after editing this file, and finally created "Patent Data 1.txt" and saved this file to the local folder and the synchronization folder.

(2) The user created a backup of the local folder of the main PC in the backup folder nested in the local folder of the NAS at a predetermined time on a same data (20130305).

(3) On the next day (20130306), the user edited "Patent Data 1.txt" on the main PC, saved "Patent Data 1_2.txt" after editing this file, and finally created "Patent Data 2.txt" and saved this file to the local folder and the synchronization folder. On this same day, the backup files of the files saved in the local folder were created in the backup folder of the NAS.

(4) The user downloaded "Patent Data 2.txt" from the synchronization folder of the cloud server by operating the smartphone, saved this file to the local folder, editing this file, then saved "Patent Data 2_2.txt" and "Patent Data 2_3.txt" to the local folder, and finally created "Patent Data 3.txt" and saved this file to the local folder, and also uploaded and saved this file in the synchronization folder on the cloud server.

(5) The user copied "Patent Data 3.txt" to the local folder and editing this file by operating the notebook PC, and saves the created "Patent Data 4.txt" to the local folder and the synchronization folder.

The state when the operation up to this point was performed is indicated in FIG. 4. By this process, from "Patent Data 1.txt" to "Patent Data 4.txt" are saved in the synchronization folders (sync/) of all the terminals excluding the smartphone.

(6) A case where the users searches for a file using the smartphone in this state, selects the file from the search result, and edits and updates the file will now be described in sequence.

In the state where 32 files are stored in the file storages of the five terminals, as indicated in FIG. 4, the user searches for a file among the five terminals using the file management program according to this embodiment, then the following search result is acquired. It is assumed that a search keyword string, which is a search condition for a file search, is "Patent Data".

FIG. 5 indicates a first search result. In FIG. 5, all of the 32 files which received a hit by the search keyword string "Patent Data" are displayed along with a file path of each file. In this way, if the synchronization service and the backup service are used, the same files, that is, the files having a same name, are saved with redundancy, and therefore the same files are displayed in the search result with redundancy. Therefore it is difficult for the user to select the file from the search result where many files, which are partially redundant, are displayed. Further, if the size of the display screen is limited, such as a case of a smartphone, all the files are not able to be displayed, which makes selection of a file even more difficult.

FIG. 6 indicates a second search result. In FIG. 6, files are displayed excluding redundant files (files with a same name) out of the 32 files which received hits by the search keyword string "Patent Data". As a result, the user selects a desired file out of nine files, which makes file selection easy.

The file management program according to this embodiment preferably displays the search result without the redundant files, as indicated in the second search result. However all the files may be displayed as indicated in the first search result.

Figure 7:
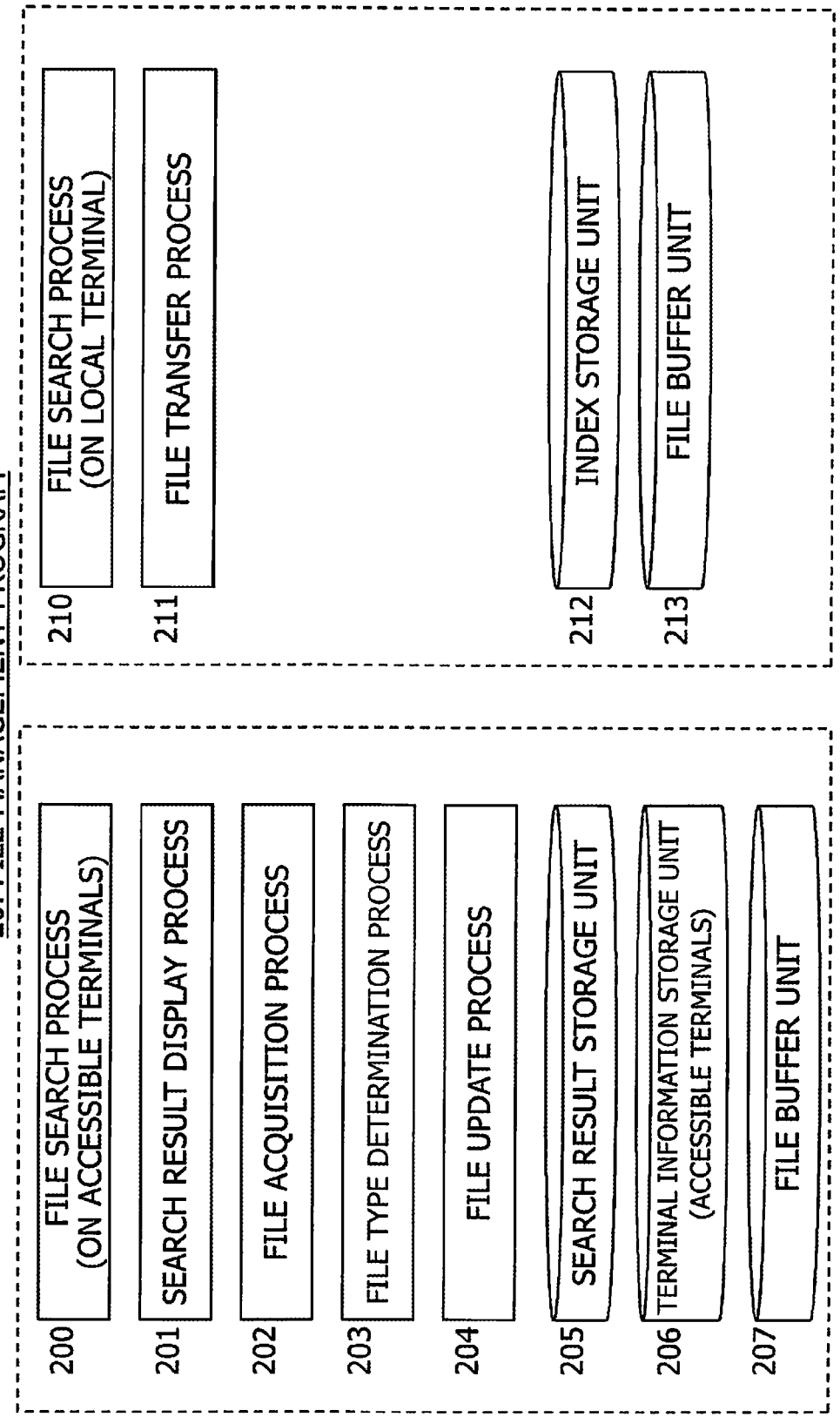
FIG. 7 is a diagram depicting processes of the file management program according to this embodiment.

FIG. 7 is a diagram depicting processes of the file management program according to this embodiment. The file management program is installed on a terminal, and when the file management program is operated on this terminal, the file management program searches files on this terminal and on other terminals, displays the search result, and transfers the file selected from the search result from a terminal of which transfer time is the shortest, and displays the file. Further, when the file is updated (original file is overwritten and saved) after editing, the file management program first transfers the file to a terminal of which transfer time is shortest, overwrites the original file with this file, and stores the updated file.

Therefore the file management program 20 includes the process executed on the terminal that the user is operating, and the process executed on another computer which the user is not operating. The left side of FIG. 7 indicates the process executed on the terminal that the user is operating and the data configuration thereof, and the right side of FIG. 7 indicates the process executed on another terminal and the data configuration thereof.

As indicated on the left side of FIG. 7, the processing functions of the file management program on the terminal that the user is operating includes a file search process 200 that searches files among a plurality of accessible terminals in response to a file search request under a search condition, and a search result display process 201 that displays a list of the detected files, which is the search result. Corresponding to these processes, a terminal information storage unit 206 that stores terminal information on a plurality of accessible terminals, and a search result storage unit 205 that stores the search result, are disposed in the storage 12.

In the terminal information storage unit 206, information on a plurality of terminals accessed by the user, such as an IP address of each terminal, a transfer speed to transfer a file from each terminal and a communication start time from the time when power of each terminal is turned ON to the time when a file can be transmitted/received, is stored. In the terminal information storage unit 206, full path information may be stored to a backup folder and a synchronization folder on each terminal, may be stored.

The processing functions of the file management program further include a file acquisition process 202 that transfers a file selected from the search result from another terminal and copies the file in the local folder, a file type determination process 203 that determines the type of a file on another terminal, especially whether the file is a backup file or not, and a file update process 204 that edits a selected and copied file and overwrites the acquisition source file by the edited selected file. Corresponding to the file acquisition process 202, a file buffer unit 207, to temporarily store a file transferred from another computer, is also included.

As indicated on the right side of FIG. 7, the processing functions of the file management program on another terminal include a file search process 210 that receives a file search request, searches the files on the local terminal, and returns the search result to the terminal that transmitted the file search request. Further, the processing functions of the file management program include a file transfer process 211 that transfers a selected file to the terminal that the user is operating, or transfers an edited selected file to a terminal that stores the acquisition source file or the update destination file.

Furthermore, according to the file management program, an index storage unit 212 that stores metadata of all the files stored on the local terminal, such as file name, file size, creation data, creator, path of the folder, and related keywords, in order to search the files on the local terminal, in response to a file search request from the terminal that the user is operating, and a file buffer unit 213 that temporarily stores a file to be updated, are disposed in the storage 12.

[Outline of File Management Process]

Figure 8:
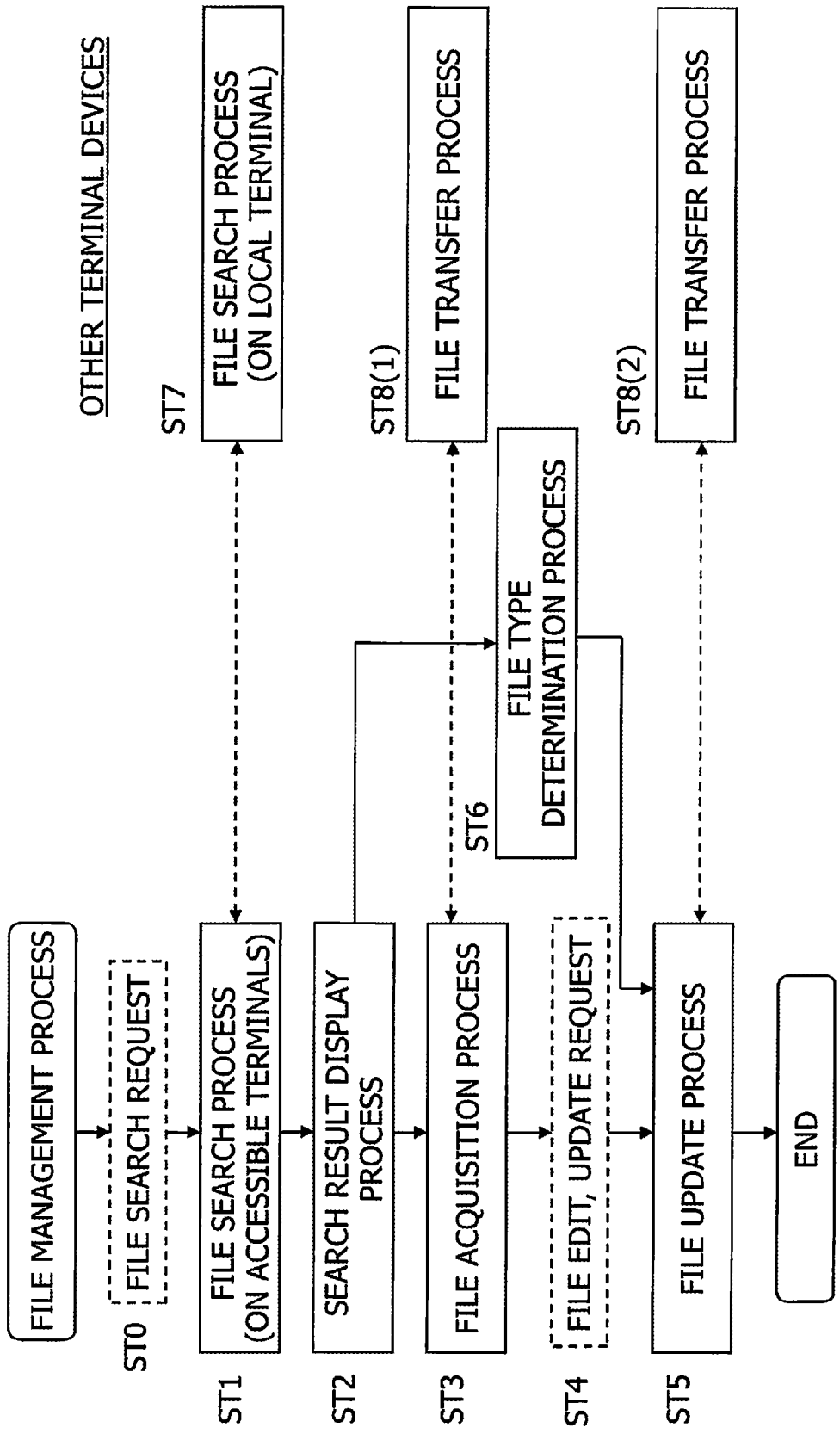
FIG. 8 is a flow chart depicting an outline of the file management process.

FIG. 8 is a flow chart depicting an outline of the file management process. The file management process in FIG. 8 is performed when a CPU, which is a processor of a terminal, executes a file management program. In FIG. 8, the left side indicates the file management process on the terminal device that the user is operating, and the right side indicates the file management process on another terminal device.

If the user inputs a search condition into a terminal device that the user is operating (hereafter called "operation terminal") and requests a file search (ST0), the file management program executes the file search among the operation terminal and a plurality of other terminal devices which are communicably connected to the operation terminal and are registered as file search target terminals (ST1). The search condition is, for example, a file name and a keyword included in a file name. By this file search process, the file management program on the operation terminal performs the file search for the files on the operation terminal. For the files on the other terminal devices, the file management program on each of the other terminals performs the file search, and returns the search result to the operation terminal. The search result includes a file name of a file that matches the search condition, full path information of the file, and a time stamp when the file was created or updated, for example. The search result may include type information on whether the file is a backup file or a synchronization file. The search result may also include status information on whether each of the other terminals is in power saving mode, the time taken to recover from power saving mode, the transfer speed of the file or the like.

If a search result is received from each of the other terminals, the file management program on the operation terminal displays the search result (ST2). The display format of these search results either displays the file names and the full path information thereof, and allows a redundancy of the file names, as indicated in FIG. 5 or displays the file names without redundancy, as indicated in FIG. 6. For the user to select a file from the search results, the display format that avoids redundancy of file names, as in the case of FIG. 6, is preferred.

If the user selects a file from the list of the file names in the search result, the file management program on the operation terminal executes a file acquisition process to transfer the selected file from another terminal, and saves the file in the local file of the operation terminal (ST3). In the file acquisition process, the file management program calculates the transfer time that is taken for a file transfer from each of the other terminals storing the same file (same file name) as the selected file to the operation terminal, selects the other terminal of which the transfer time is shortest, and requests the selected other terminal to transfer the selected file. This transfer request includes a file name and full path information of the selected file. The selected file may be a backup file.

Responding to the selected file transfer request, the file management program on the requested other terminal transfers the requested selected file to the operation terminal (ST8(1)). The operation terminal saves the received selected file in the local file, and displays the file (ST3).

The file management program on the operation terminal performs a file type determination process for at least a file which is selected out of the files included in the search result and which has been edited (ST6). This file type determination process is a process to determine whether at least the selected file is a backup file or not. The file type determination process may also determine whether the selected file is a synchronization file or not.

If the user edits the selected file on the operation terminal and requests an overwrite and save (update) of the file (ST4), the file management program on the operation terminal executes a process to overwrite (update) the acquisition source file of the selected file with the edited selected file, and saves the updated file (ST5). In this case, it is preferable that the file management program transfers the edited selected file once to a terminal device of which transfer time of the edited selected file is the shortest among the other terminal devices, then the terminal device which received the edited selected file performs the overwrite and save (update) process on the acquisition source file of the selected file. Thereby the operation terminal completes the file transfer process for executing the overwrite and save (update) process, in a short time.

Furthermore, in the file update process, if the acquisition source file of the selected file is a backup file, the file management program performs an overwrite and save (update) process, regarding the same file (same file name) other than the backup file as the update destination file.

Moreover, in the file update process, if the source file of the selected file is a synchronization file, the file management program may perform the overwrite and save (update) process on a file of which file transfer process can be executed in the shortest time, including the other synchronization files as the overwrite and save (update) process target candidates. If a synchronization folder is set on the operation terminal in this case, the overwrite and save (update) process is performed on a file having the same file name as the selected file in the synchronization folder. Then by the synchronization service, the changed synchronization file is overwritten and saved (updated) to a synchronization file in a synchronization folder of other terminals as well.

In response to the file update process ST5, the file management program on the terminal device of which transfer time is determined as the shortest among the other terminal devices, temporarily receives an edited selected file, and transfers the edited selected file to a terminal device for storing an acquisition source file of the selected file to perform the overwrite and save (update) process (ST8(2)).

According to the file management program, (1) the files among a plurality of terminal devices are searched and the same files (same file name) stored redundantly are all detected, and a file of a terminal device of which transfer speed is fastest at this point is selected, out of the plurality of terminal devices storing the same file as the selected file, and is transferred to the operation terminal, hence the time taken for file acquisition is decreased.

(2) If an overwrite and save (update) process request is generated after a file is edited, the file is transferred first to a terminal device of which transfer time of the edited file is shortest, out of the plurality of terminal devices, then an overwrite and save (update) process is performed on the original file, hence operation on the operation terminal transfers to the next operation in a short time.

(3) When a selected file is transferred, a file of which transfer time is shortest is transferred including a backup file, but when an edited file is overwritten/saved (updated), a same file other than a backup file is overwritten and saved (updated), hence an unintended change in the backup file is avoided.

[Details on File Management Process]

Figure 9:
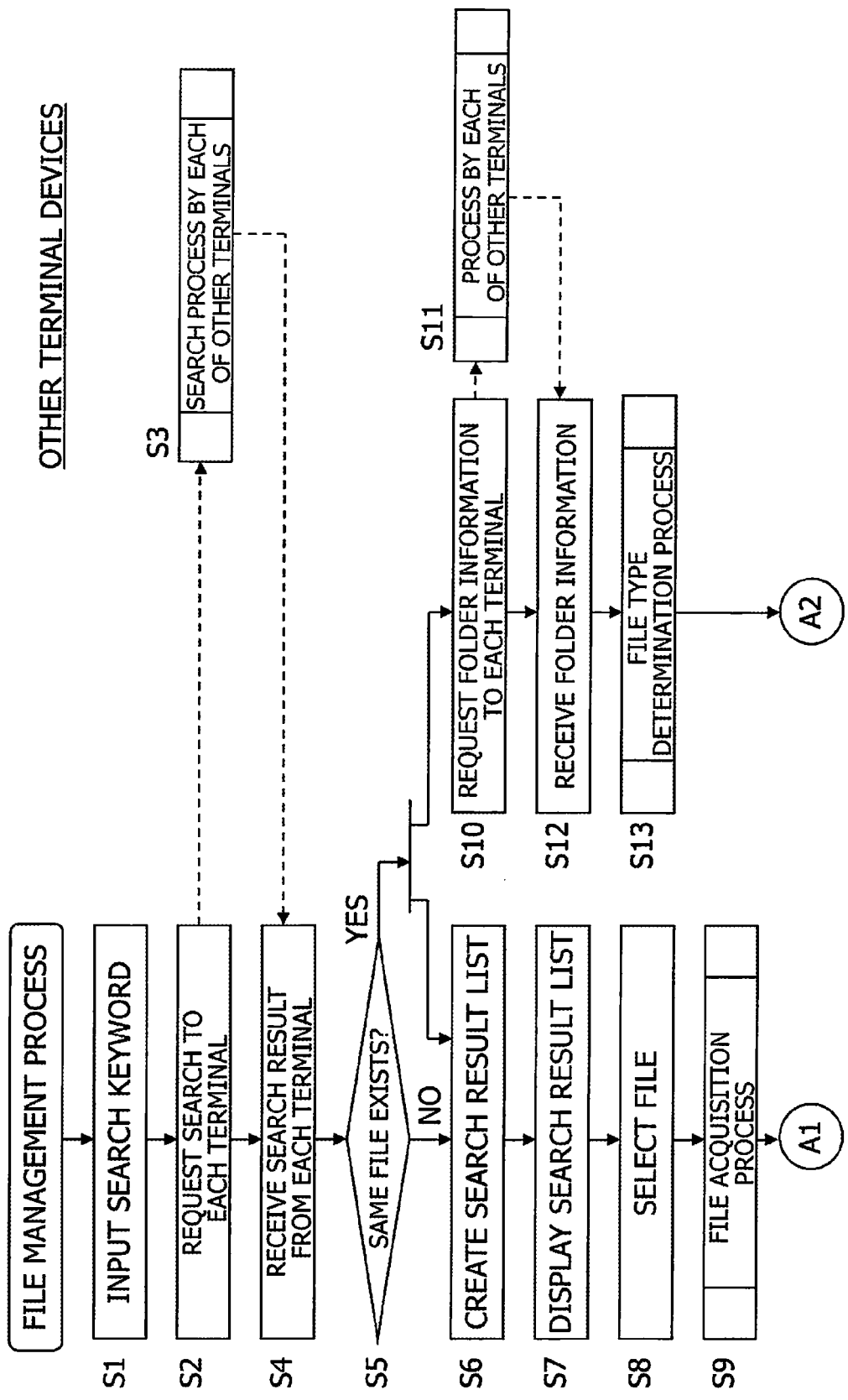
FIG. 9 is a flow chart depicting the detailed process of the file management program according to this embodiment.
Figure 10:
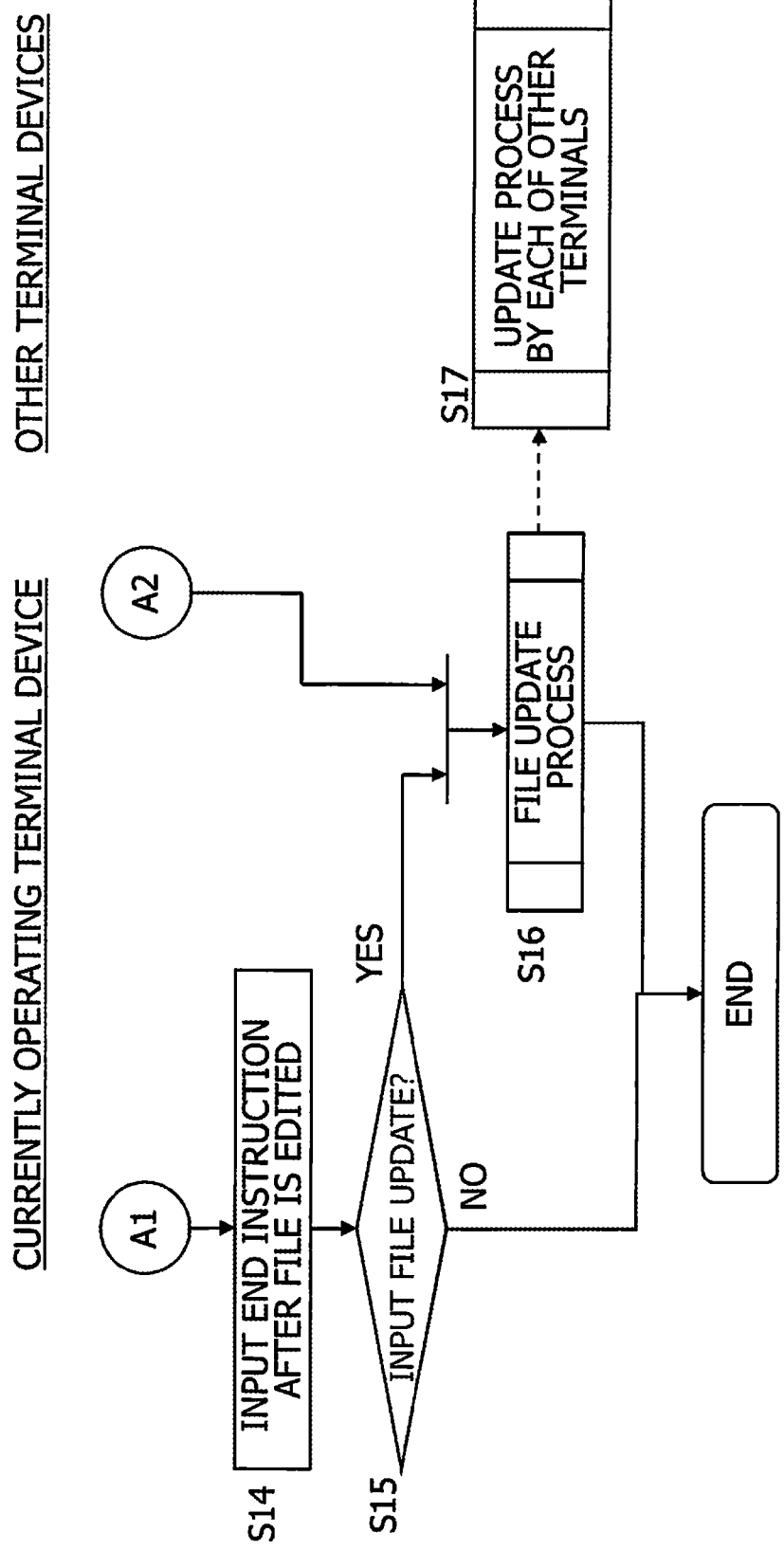
FIG. 10 is a flow chart depicting the detailed process of the file management program according to this embodiment.

FIG. 9 and FIG. 10 are flow charts depicting the detailed process of the file management program according to this embodiment. In both FIG. 9 and FIG. 10, the left side indicates a process in the currently operating terminal device, and the right side indicates a process in the other terminal devices. FIG. 11, FIG. 12, FIG. 14, FIG. 17 and FIG. 18 are flow charts depicting the processes in FIG. 9 and FIG. 10. Details on the processes of the file management program will now be described.

It is assumed that the currently operating terminal device is the smartphone 4 in FIG. 1. When the user inputs a search condition, such as a search keyword, into the currently operating terminal device, and a search request is generated (S1), the file management process program requests the file search to other terminal devices (S2). The file search target terminal devices, which communicates with the currently operating terminal device via a network, have been registered in the terminal information storage unit 206, for example.

In response to this, the file management program on each of the other terminal devices searches the index storage unit 212 using the search keyword included in the search condition, and detects a file matching the search condition (S3). Then each of the other terminal devices returns the search result to the operation terminal that generated the search request, and the operation terminal receives the search result and stores the file information on the search result in the search result storage unit 205 (S4). The search result includes, for example, a file name and a full path thereof (Patent Data 0.txt, main_PC/c/Data/), as indicated in FIG. 5. If the other terminal device stores file type information (e.g. normal file, backup file, synchronization file), it is preferable to include the file type in the search result. A file size, time stamp of file creation and file update or the like may also be included.

Figure 11:
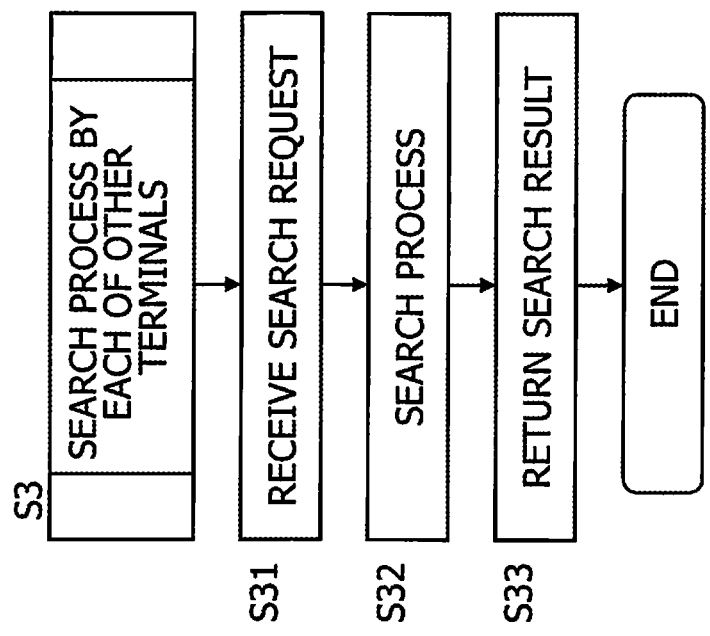
FIG. 11 is a flow chart depicting the file search process S3 on each of the other terminal devices.

FIG. 11 is a flow chart depicting the file search process S3 on each of the other terminal devices. The file management program on the other terminal devices receives a search request (S31), and searches the index storage unit 212 based on the search condition (S32). Then the other terminal device returns the search result to the currently operating terminal device that sent the search request (S33).

Referring to FIG. 9 again, the operation terminal which is the currently operating terminal device sequentially receives the search results from the other terminal devices, and if the same file (same file name) is included in the search result (YES in S5), the operation terminal performs the file type determination process in steps S10 to S13. If the same file is included in the search results received from the plurality of other terminal devices, this file is a backup file, a synchronization file or a file that the user intentionally saved as a redundant file. Therefore if a redundant file is included, the type of this file is detected in advance. However file type information is used to determine a file to be overwritten when an overwrite and save (update) process is performed on the edited file, therefore the file type determination process may be performed on the edit target file and on the files which are the same as this file, after the user searched for the file from the search result and started editing. The file type determination process may be a process to confirm at least whether the file is a backup file or not. The file type determination process will be described in detail later.

The file management program in the operation terminal creates a search result list based on the search result received from each of the other terminals (S6). The search result list is stored in the search result storage unit 205.

The file management program displays the search result list on the display device of the operation terminal (S7). The display format of the search result list is the display format indicated in FIG. 5 or FIG. 6. To make the file selection easier for the user, it is preferable to display file names without redundancy, as in the example in FIG. 6. It is also preferable not to display information on terminals storing files or full path information of the files other than file names, as in the example in FIG. 6.

Then the user selects a file from the displayed search result list (S8). In this example, it is assumed that the file selected by the user is stored on a plurality of terminal devices other than the smartphone, which is the operation terminal, as seen in "Patent Data 1.txt" and "Patent Data 4.txt" in the example in FIG. 4. In response to this selection, if the selected file is a file on another terminal device, the file management program on the operation terminal execute the file acquisition process by transferring the selected file from the other terminal device to the currently operating terminal, and displaying the selected file (S9).

[File Acquisition Process]

Figure 12:
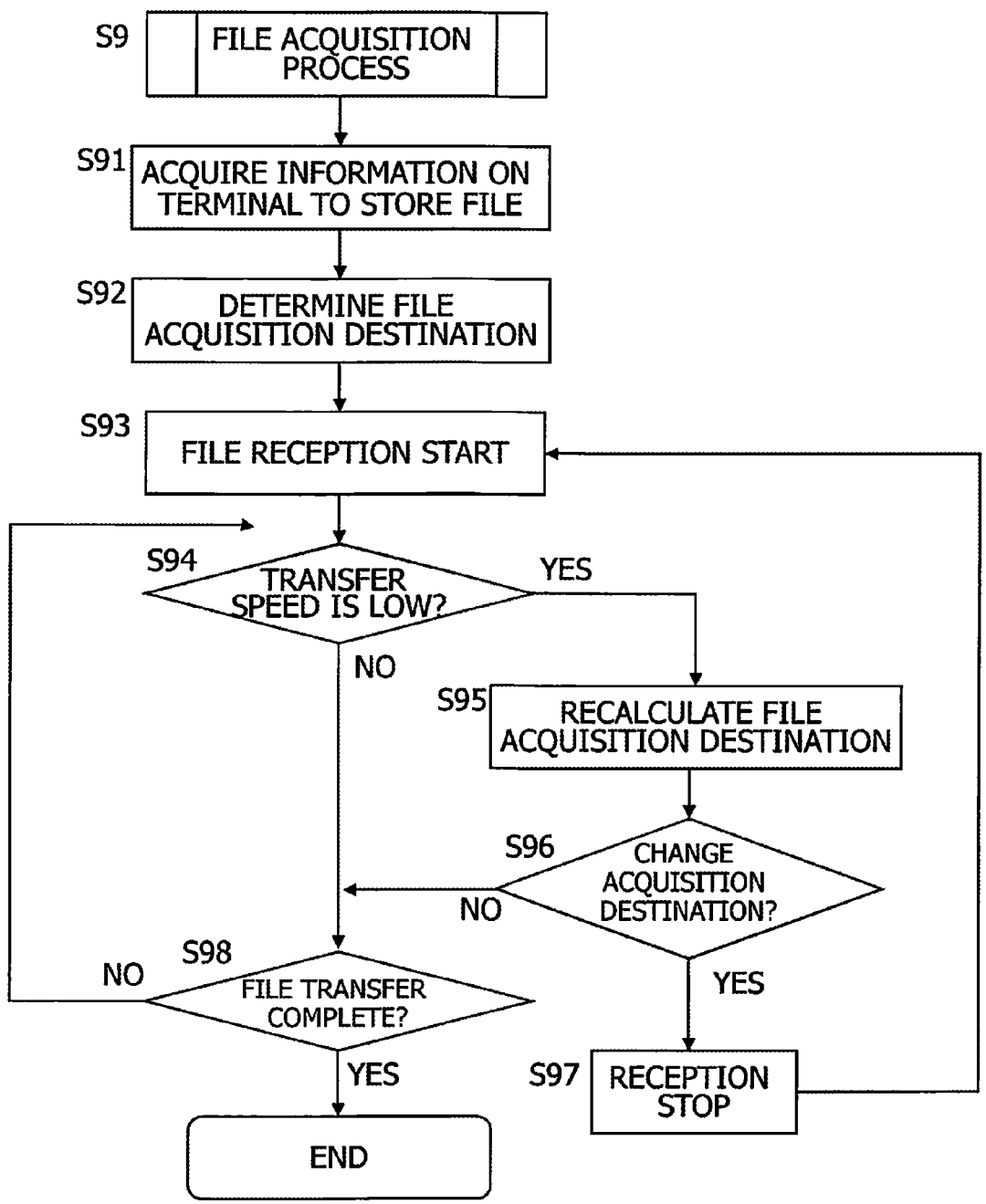
FIG. 12 is a flow chart depicting the file acquisition process S9.

FIG. 12 is a flow chart depicting the file acquisition process S9. The file management program on the currently operating terminal device acquires terminal information on a terminal storing the selected file from the terminal information storage unit 206 (S91). If the same file (same file name) as the selected file is stored on a plurality of other terminal devices, the file management program determines a file acquisition destination (S92). To determine the file acquisition destination, a terminal device of which the time taken for file transfer is shortest is selected. The file of the file acquisition destination may be either a backup file or a synchronization file.

FIG. 13 is a table used by the file management program to calculate the file transfer time. As illustrated in FIG. 1, the smartphone 4, which is the operation terminal, is communicably connected with the other terminals via the access points AP1 and AP2. Therefore the information for calculating the file transfer time includes the communication speed (Mbps) when the smartphone 4 is connected to each access point AP1 and AP2 and communicates with other terminals as illustrated in FIG. 13. The information for calculating the file transfer time may also include the time taken until the file transfer is started when the terminal is in power saving mode (P-SAVE in FIG. 13).

Data including the communication speed on the other terminal devices in FIG. 13 have been measured in advance and stored in the terminal information storage unit 206. This data may be measured and updated periodically.

If the smartphone 4, which is the operation terminal, is connected to the access point AP1, as illustrated in FIG. 1, the information enclosed by the broken line in FIG. 13 is used. According to the first file transfer time calculation method, it is determined that an NAS, of which communication speed is fastest, is a terminal of which file transfer time is shortest.

According to the second file transfer time calculation method, the time taken to start communication when the terminal is in power saving mode is considered as well, and the file transfer time is calculated by adding the time taken to start communication and the time taken to transfer the file (time acquired by dividing the file size by the communication speed). For example, it is assumed that a part of four terminal devices are in power saving mode, and the file size of the transfer target file is 100 Mbit. It is also assumed that the NAS is in power saving mode and the notebook PC is in normal operation mode. In this case, if the NAS, of which the time taken to start transfer is 5 seconds and the transfer time is 100 Mbit/50 Mbit=2 seconds, is selected, the file transfer time is 5+2=7 seconds. If the notebook PC, which is in normal operation mode and which can start transfer immediately, is selected, the file transfer time is 100 Mbit/20 Mbit=5 seconds. This means that the file transfer time of the notebook PC is shorter, and the notebook PC is selected as the terminal device at the file acquisition destination.

As indicated in FIG. 12, when the file acquisition destination is determined, the file management program on the operation terminal requests the file acquisition destination terminal device to transfer the file, and starts receiving the selected file (S93). The file management program monitors the file transfer speed, and if the actual transfer speed is the same as the expected speed (NO in S94), the file management program ends the file acquisition process when the file transfer is completed (YES in S98). If the actual transfer speed is lower than the expected speed (YES in S94), however, the file management program performs the calculation again to select the acquisition destination terminal in the selection file (S95), and if there is a terminal device of which the file transfer time is shorter than the current terminal device (YES in S96), the file management program stops the reception of the current file transfer, and requests the new terminal device to transfer the file, and starts receiving the file (S93).

In this way, it is preferable that a file acquisition destination terminal device is selected based on a pre-measured communication speed, and the transfer speed is monitored after the actual file transfer is started, and if the transfer speed is slow for any reason, the file acquisition destination terminal device is switched to a terminal device of which the file transfer time is likely to be shorter.

[File Type Determination Process]

If the same file exists in the search result in FIG. 9, the file may be a backup file or a synchronization file, hence the file management program on the operation terminal executes the file type determination process in steps S10 to S13.

First the file management program requests each terminal device storing the same file to send the folder information of the file (S10). The folder information includes information on whether the folder storing the file is a backup folder, a synchronization folder or a normal folder (a folder other than a backup folder and a synchronization folder).

If a folder information table that associates a folder and folder information thereof is set in each terminal by the user, the terminal device, which is requested to send the folder information, returns the folder information table to the operation terminal (S11). The file management program of the operation terminal refers to the folder information table, and executes the file type determination process S13 to determine the type of each file based on the full path of each file.

If the file management program of the operation terminal is not able to acquire the folder information from the other terminal, the file management program analyzes the folder and the file information on the other terminal, and determines at least whether the file is a backup file or not. This file determination process is as follows.

[File Type Determination Process]

Figure 14:
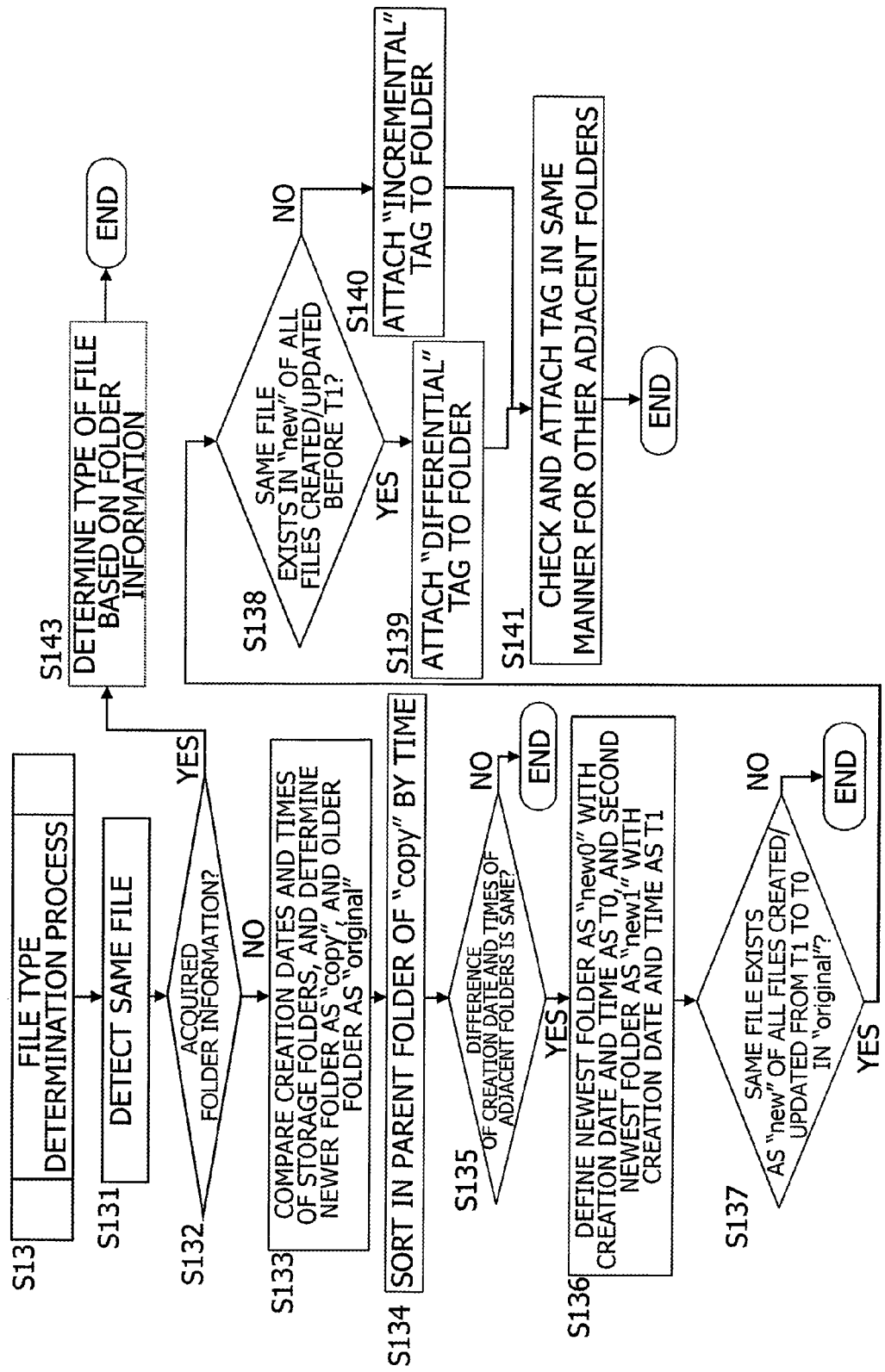
FIG. 14 is a flow chart depicting the file type determination process.
Figure 15:
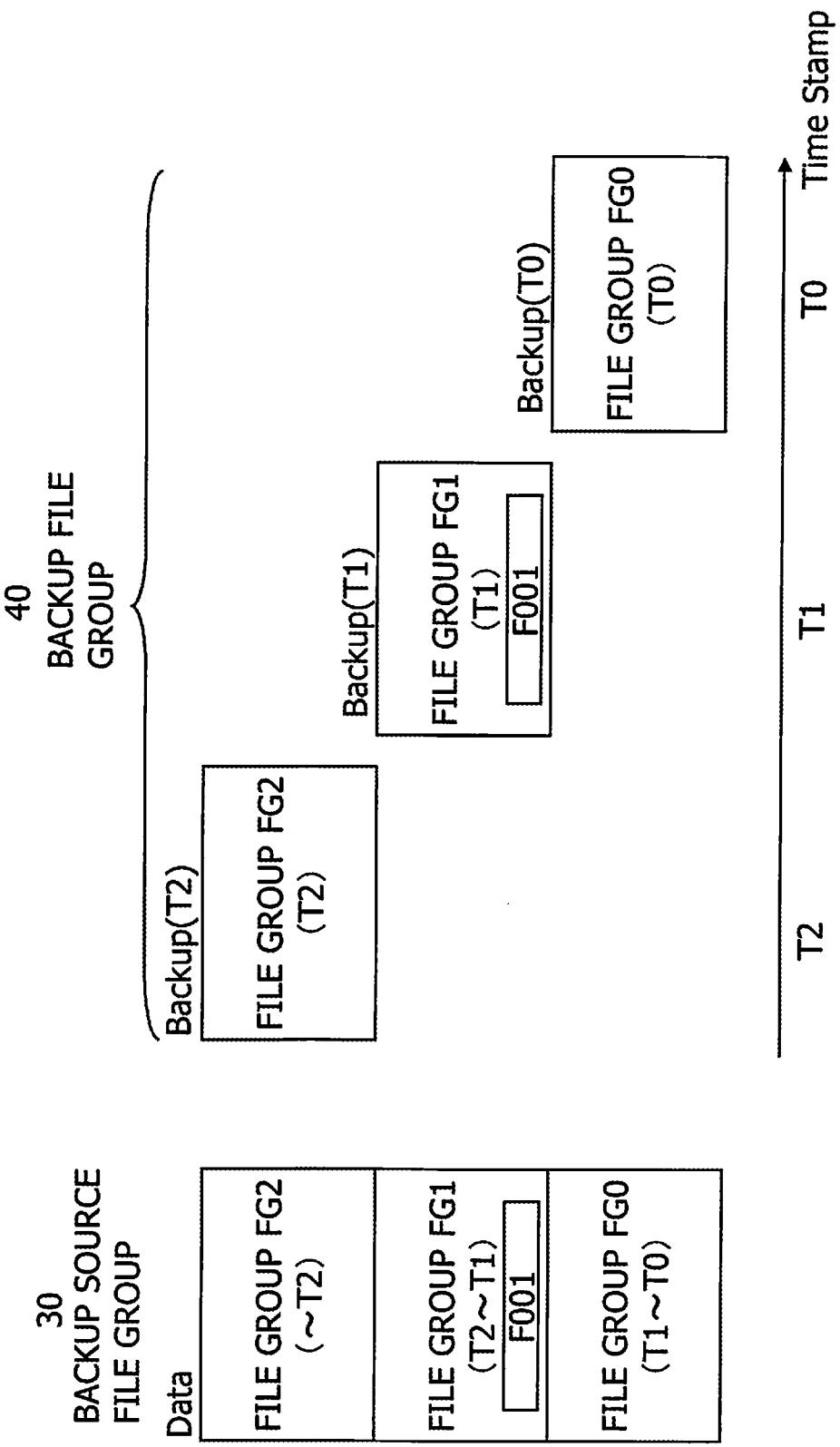
FIG. 15 is a diagram depicting the characteristics of backup files.
Figure 16:
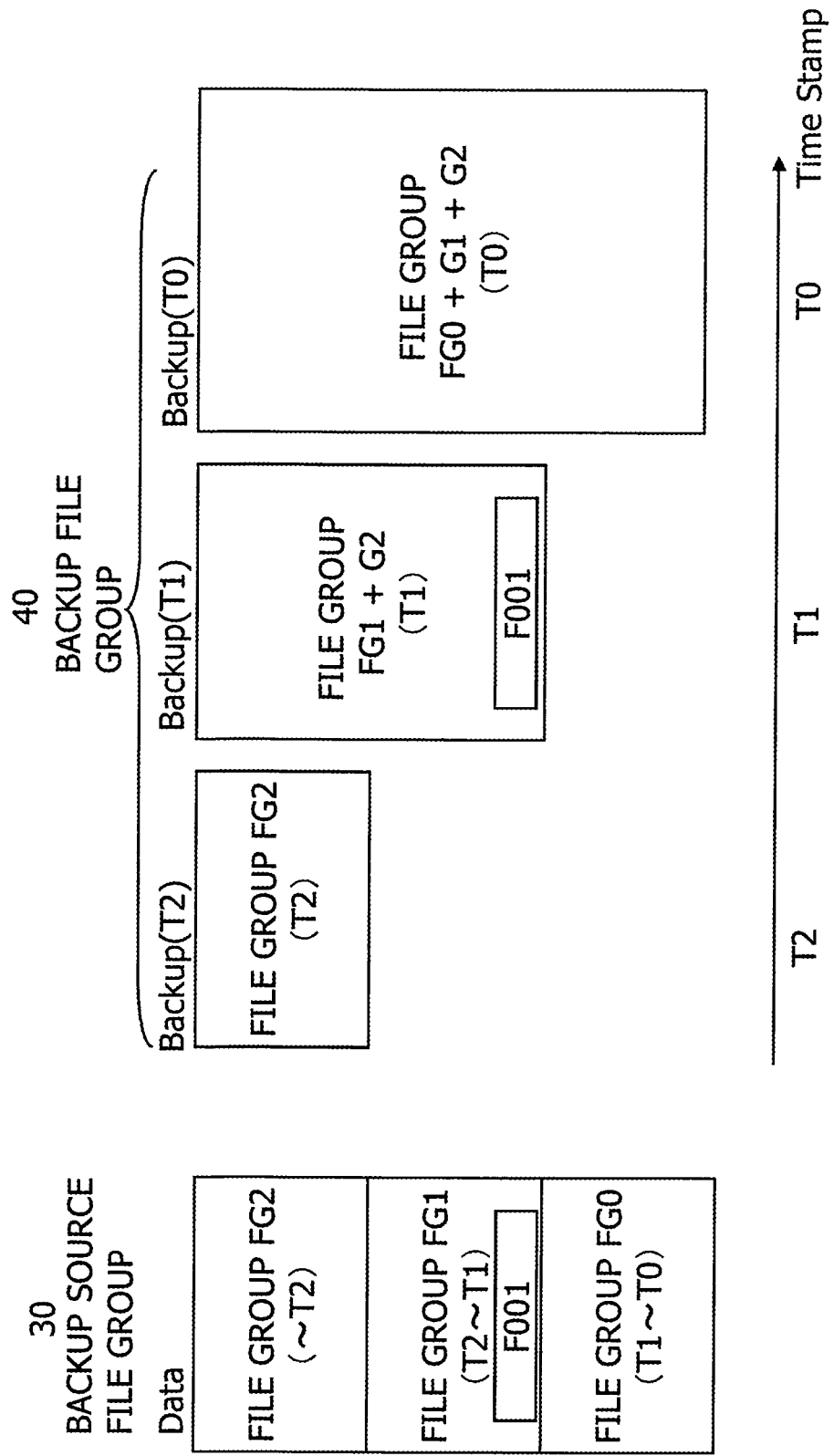
FIG. 16 is a diagram depicting the characteristics of backup files.

FIG. 14 is a flow chart depicting the file type determination process of S13. FIG. 15 and FIG. 16 are diagrams depicting the characteristics of backup files. The characteristics of backup files in FIG. 15 and FIG. 16 will be described first, then the file type determination process in FIG. 14 will be described.

FIG. 15 illustrates backup source file groups 30 and backup file groups 40. According to the example in FIG. 4, a file group in the local folder of the main PC corresponds to the backup source file group 30, and a file group in the local folder of NAS corresponds to the backup file group 40.

It is assumed that file groups FG2, FG1 and FG0 exist in a backup source file group 30 in sequence from the oldest storage time. In other words, the file group FG2 was stored (created or updated) before time T2, the file group FG1 was stored after time T2 and before time T1, and the file group FG1 was stored after time T1 and before time T0.

According to a first backup method, when the backup source file group 30 is stored like this, the backup file group 40 is created such that the file group FG2 is copied to a backup folder Backup (T2) of time T2 at time T2, the file group FG1 is copied to a backup folder Backup (T1) of time T1 at time T1, and the file group FG0 is copied to a backup folder Backup (T0) of time T0 at time T0 with respect to the time axis indicated on the abscissa. In other words, the first backup method is an incremental type backup method.

Here a same file F001 is included in the backup source file group FG1 and the backup file group FG1, for example. The time stamp of a file in the backup folder is more current than the time stamp of the backup source file. The time stamps (times) of the backup folders Backup are the backup times that were set, and are normally different according to a certain rule, such as 2:00 AM but at different dates.

FIG. 16 illustrates a backup source file group 30 and a backup file group 40 according to a second backup method, that is, according to a differential type backup method. Here a backup source file group 30 is the same as FIG. 15.

In this case, the backup program creates the backup file group 40 such that the file group FG2 is copied to the backup folder Backup (T2) of time T2 at time T2, the file groups FG2 and FG1 are copied to the backup folder Backup (T1) of time T1 at time T1, and the file groups FG2, FG1 an FG0 are copied to the backup folder Backup (T0) of time T0 at time T0. In other words, according to the differential type backup method, when a difference is generated between a backup source file group and a backed up file group, all of the backup source file groups are copied to the backup folder.

According to the second backup method as well, a same file F001 is included in the backup source file group FG1 and the backup file group FG1 and FG2, for example. The time stamp of a file in the backup folder is newer than the time stamp of the backup source file. The time stamps (times) of the backup folders Backup are different in accordance with a certain rule.

In the file type determination process in FIG. 14, if a plurality of same files is detected in the files of the search result in step S9 in FIG. 9 (S131), the file management program determines whether the file is a backup file or not.

If the folder information of the determination target file is acquired (YES in S132), the file type is determined based on the folder information (S143). Thereby it is determined whether the determination target file is a backup file or not.

If the folder information of the determination target file is not able to be acquired (NO in S132), it is determined whether each of the plurality of same files is a backup file or not as follows, using the backup methods in FIG. 15 and FIG. 16. First the file management program compares the creation dates/times of the folders that store the files, and regards a newer folder as a "copy", and an older folder as an "original" (S133). In the examples in FIG. 15 and FIG. 16, the folder Backup (T1) of the backup file group FG1 is a "copy", and the folder of the backup source file group 30 is an "original".

Then the file management program sorts the folders in the parent folder of the newer folder "copy" by time (S132). In other words, in the examples in FIG. 15 and FIG. 16, the folders Backup (T2), Backup (T1) and Backup (T0) in the parent folder of the folder Backup (T1) are sorted by time. Then it is determined whether the difference of the creation date/time of the adjacent folders is the same or not (S135). If the difference is not the same, it is determined that these files are not backup files, and the file type determination process ends. If the difference is the same, then it is more likely that these files are backup files.

Therefore out of the folders sorted by time in the parent folder of "copy", the file management program defines the newest folder as "new0", the creation date/time thereof as T0, the second newest folder as "new1", and the creation time thereof as T1 (S136). In the case of FIG. 15 and FIG. 16, the newest folder "new0" is the backup folder Backup (T0), and the second newest folder "new1" is the backup folder Backup (T1).

Then the file management program checks whether the same file exists in the newer folder "new", for all the files created or update between dates/times T1 to T0 in the older file "original" (S137). If the check result is NO, then it is determined that the file is not a backup file, and the file type determination process ends. If the check result is YES, then it is determined that the file is a backup file. In the case of FIG. 15, all the files created or updated between the dates/times T1 to T0 in the older folder Data are stored in the newer folder Backup (T0). This is the same for the case of FIG. 16.

Further, in order to determine whether the backup file is an incremental type or a differential type, the file management program checks whether the same file exists in the newer folder "new" for all the files created or updated before the date/time T1 in the older folder "original" (S138). If the check result is YES, the file management program attaches the "differential backup folder" tag to the newer folder "new" (S139), and if the check result is NO, the file management program attaches the "incremental backup" tag to the newer folder "new" (S140). In other words, the case of FIG. 15 is an incremental backup since the check result is NO, and the case of FIG. 16 is a differential backup since the check result is YES.

The file management program checks other adjacent folders in the same manner, and attaches tags (S141).

When the type of each file is determined in the file type determination process, it is preferable to send the file type information to the respective terminal devices, so as to be stored in the index storage unit 212 thereof. Thereby when the folder information is acquired the next time, folder information corresponding to the file type is acquired from the other terminal.

FIG. 14 does not indicate a method of determining whether the file is a synchronization file or not. However in the case of a synchronization file, the file configuration of the folder is the same between synchronized folders, and whether the file is a synchronization file or not can be determined by the fact that the time stamps of the files in the synchronization folder have no regularity.

[File Update Process]

Referring back to FIG. 10, when the user edits the selected file on the operation terminal, and inputs an instruction to end the editing (S14), and inputs an instruction to perform an overwrite and save (update) for the edited file (YES in S15), the file management program on the operation terminal executes the file update process S16. In accordance to the file update process S16, the file management program on the other terminal devices executes the update process S17 on the respective terminal.

Figure 17:
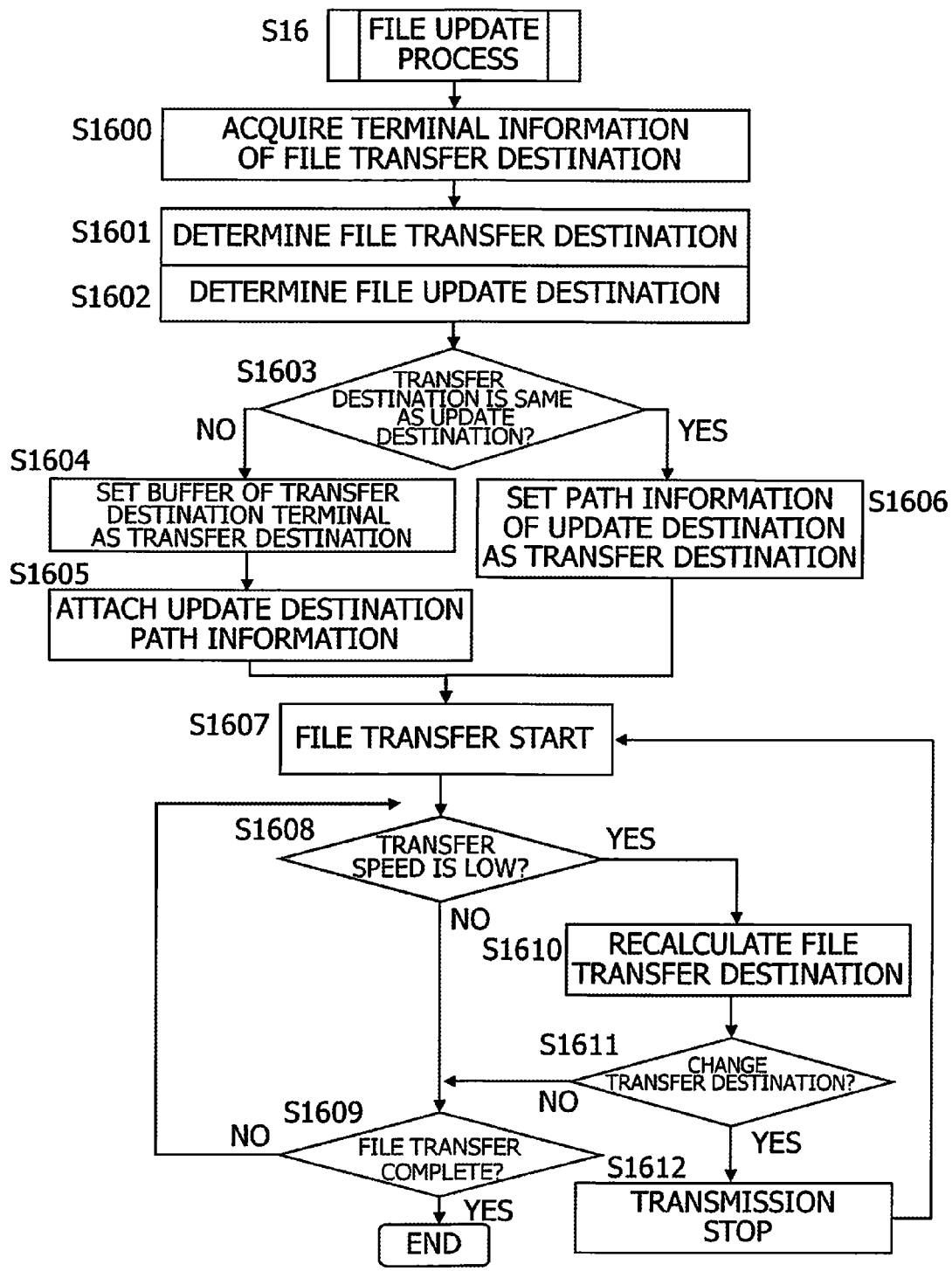
FIG. 17 is a flow chart depicting the file update process S16.

FIG. 17 is a flow chart depicting the file update process S16. In the file update (overwrite and save) process, the file management program on the operation terminal first transfers the edited file to a terminal of which transfer time of the edited file is shortest, among the other terminals, and ends the process on the operation terminal. Path information of the update destination file where the overwrite and save (update) process is performed is attached to the edited file to be transferred. The terminal to which the edited file is transferred first transfers the transferred edited file to a terminal which stores the update destination file, and allows the terminal to perform an update (overwrite and save) process. As a rule the update destination file is the acquisition source file of the edited file, but if the acquisition source file is a backup file, then the update destination file is changed to a file other than a backup file.

The file management program on the operation terminal first acquires terminal information of the edited file transfer destination candidate terminal from the terminal information storage unit 206 (S1600), and determines a temporary transfer destination of the edited file (S1601). In this determination, a terminal of which time to transfer the edited file is shortest is selected.

In addition to the determination of the temporary transfer destination of the edited file, the file management program on the operation terminal also determines an update destination file of the edited file (S1602). As a rule the update destination file is an acquisition source file of the edited file. However if the acquisition source file is a backup file, then an update destination file other than a backup file is selected, since it is not desirable to update a backup file.

For example, it is preferable to select an update destination file having the same file name as the acquisition source file in the sequence from the newest creation date/time. Further, it is preferable to select an update destination file in the sequence from the newest access time among the synchronization files.

If the transfer destination and the update destination are the same (YES in S1603), the path information of the update destination is set to the transfer destination (S1606), and if the transfer destination and the update destination are different (NO in S1603), the buffer in the transfer destination terminal is set to the transfer destination (S1604), and the update destination path information is attached to the edited file to be transferred (S1605). Then file transfer is started (S1607).

When the file transfer is started, the file transfer speed is monitored, and if the transfer speed is the expected speed (NO in S1608), the file transfer is permitted to complete (YES in S1609), then the file update process ends. If the transfer speed is slower than the expected speed (YES in S1608), calculation to select a new file transfer destination is performed again (S1610), and if a terminal of which transfer time is shorter is detected (YES in S1611), transmission of the current file transfer is stopped (S1612), and file transfer to the new transfer destination terminal is restarted (S1607).

Figure 18:
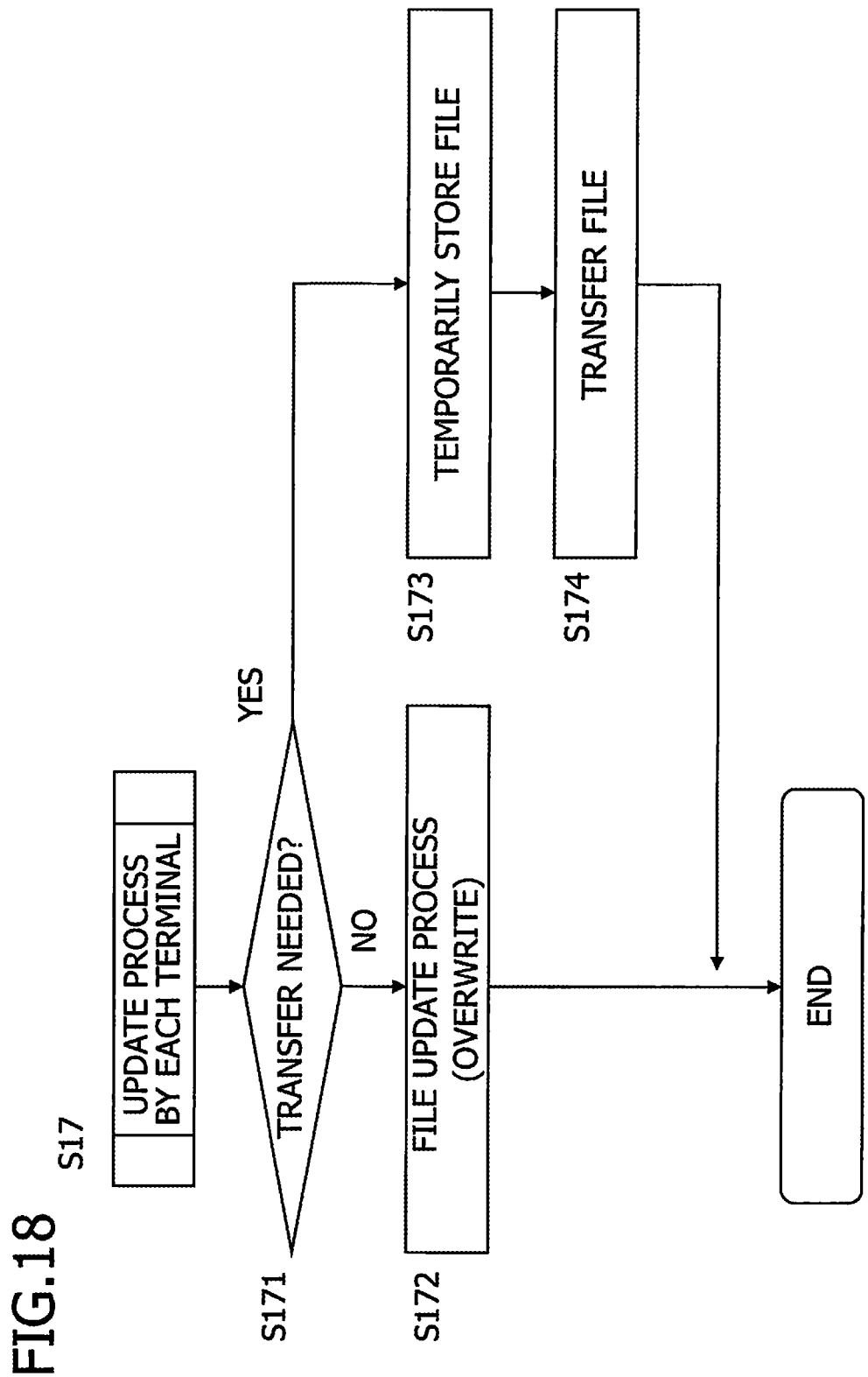
FIG. 18 is a flow chart depicting the update process by another terminal device in the file update process.

FIG. 18 is a flow chart depicting the update process by another terminal device in the file update process. If transfer is needed for the transferred edited file (YES in S171), the file management program on the other terminal temporarily stores the edited file in the file buffer unit 213 (S173), and transfers the edited file to the path of the update destination file (S174). If transfer is not needed (NO in S171), the file management program performs an overwrite and save (update) process for the edited file, and updates the update destination file (S172).

In this way in the file update process, a file other than a backup file is selected for an update destination file, and the edited file is transferred to a terminal storing the update destination file via a terminal to which the file is transferred at the shortest transfer time, and the updating process is performed, hence the update process on the operation terminal is ended in a short time. Further, updating a backup file is avoided.

As described above, according to the file management program of this embodiment, if the user searches for a file on the operation terminal in a state where files are redundantly stored in a plurality of terminals, the search is performed to include the other terminals, and the search result is summarized and displayed on the currently operating terminal. If the user selects a file from the displayed search result list, the file is copied to the currently operating terminal from a terminal which allows acquiring the file most quickly, among the terminals storing the file, and editing of the file becomes possible. If the overwrite and save instruction is received after the editing operation, the file is transferred to a terminal of which transfer time is shortest, out of the plurality of terminals, then the overwrite and save process is executed on the file at the update destination. Files to be acquired may include a backup file, however files at the overwrite and save (update) destination do not include a backup file.

Therefore the user acquires a selected file in a short time without considering the correspondence of terminals and files stored therein, and if a file is edited and overwritten and saved (updated), overwriting a backup file in error is avoided, and the update process is completed in a short time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium that stores a file management program therein for causing a computer to execute a file management process comprising:

transmitting, in response to a file search request based on a search condition, a file search request based on the search condition from a currently operating information processing apparatus to a plurality of other information processing apparatuses, receiving file information searched by the plurality of other information processing apparatuses respectively, and displaying the file information in a search result on the currently operating information processing apparatus;

selecting a first information processing apparatus to be a transfer source out of the plurality of other information processing apparatuses that store a same file as a selected file which is selected from the search result;

requesting transfer of the selected file to the first information processing apparatus to be the transfer source that is selected, receiving the selected file that is transferred and displaying the selected file on the currently operating information processing apparatus;

selecting a second information processing apparatus to be a transfer destination out of the plurality of other information processing apparatuses after the displayed selected file is edited to form an edited selected file and in response to an update request for the edited selected file, based on transfer time to transfer the edited selected file from the currently operating information processing apparatus to the plurality of other information processing apparatuses respectively; and transferring the edited selected file to the second information processing apparatus to be the transfer destination, and transferring the edited selected file to a third information processing apparatus that stores an update destination file of the edited selected file via the second information processing apparatus to be the transfer destination, such that the update destination file is updated.

2. The non-transitory computer-readable storage medium that stores the file management program according to claim 1 further comprising:

selecting an acquisition source file of the edited selected file as the update destination file, and selecting a file other than a backup file when the acquisition source file is a backup file, wherein the acquisition source file is stored in the first information processing apparatus to be the transferred source.

3. The non-transitory computer-readable storage medium that stores the file management program according to claim 2 further comprising:

making a file type determination as to whether the same file as the selected file, stored in each of the plurality of other information processing apparatuses that stores the same file, is a backup file or not.

4. The non-transitory computer-readable storage medium that stores the file management program according to claim 3, wherein in determination of the file type, a first folder of which creation date/time is more current and a second folder of which creation date/time is older, constituting a pair of folders storing the same file as the selected file, are found, a plurality of folders in a parent folder of the first folder are sorted by the creation date/time, and when a first condition that a difference of the creation date/time of folders, that are adjacent in terms of the creation date/time, is the same, is satisfied, the file in the first folder is determined as a backup file.

5. The non-transitory computer-readable storage medium that stores the file management program according to claim 4, wherein in determination of the file type, when the first condition is satisfied and when a folder having a first creation date/time, out of the plurality of folders in the parent folder, stores all the files stored in the second folder and having a creation date/time from the first creation date/time to a second creation date/time, which is older than the first creation date/time by the difference, the file in the folder having the first creation date/time is determined as a backup file.

6. The non-transitory computer-readable storage medium that stores the file management program according to claim 3, wherein in determination of the file type, whether the same file as the selected file is a backup file or not is determined based on file type information that indicates whether the same file as the selected file is a backup file or not, the file type information being acquired from the plurality of other information processing apparatuses that stores the same file as the selected file.

7. The non-transitory computer-readable storage medium that stores the file management program according to claim 1, wherein in selecting the first information processing apparatus to be the transfer source, the transfer time to transfer the selected file from each of a plurality of other information processing apparatuses that stores the selected file to the currently operating information processing apparatus is calculated based on transfer speed from each of the plurality of other information processing apparatuses to the currently operation information processing apparatuses, or based on the transfer speed, a file size of the selected file, and transfer start time taken by each of the plurality of other information processing apparatuses to start transfer, and another information processing apparatus that has a shortest transfer time is selected as the first information processing apparatus to be the transfer source.

8. The non-transitory computer-readable storage medium that stores the file management program according to claim 1, wherein in selecting the second information processing apparatus to be the transfer destination, the transfer time to transfer the edited selected file from the currently operating information processing apparatus to the plurality of other information processing apparatuses respectively is calculated based on transfer speed from the currently operating information processing apparatus to each of the plurality of other information processing apparatuses, or based on the transfer speed, a file size of the edited selected file, and reception start time taken by each of the plurality of other information processing apparatuses to start reception, and another information processing apparatus that has a shortest transfer time is selected as the second information processing apparatus to be the transfer destination.

9. The non-transitory computer-readable storage medium that stores the file management program according to claim 1, wherein in displaying the file information in the search result, the file information in the search result is displayed avoiding a redundancy of file names.

10. The non-transitory computer-readable storage medium that stores the file management program according to claim 1, wherein in selecting the first information processing apparatus to be the transfer source, a transfer-target selected file stored in the selected first information processing apparatus to be the transfer source is permitted to be a backup file.

11. The non-transitory computer-readable storage medium that stores the file management program according to claim 1, wherein the plurality of other information processing apparatuses include an information processing apparatus that edits files as well as a storage device that does not edit files but that stores files.

12. A file management apparatus that manages files in a plurality of information processing apparatuses which are communicably connected via a network, comprising:
a memory;
a processor, connected to the memory, that perform a process including,
   transmitting, in response to a file search request based on a search condition, a file search request based on the search condition from a currently operating information processing apparatus to a plurality of other information processing apparatuses, receiving file information searched by the plurality of other information processing apparatuses respectively, and displaying the file information in a search result on the currently operating information processing apparatus;
   selecting a first information processing apparatus to be a transfer source out of the plurality of other information processing apparatuses that store a same file as a selected file which is selected from the search result;
   requesting transfer of the selected file to the first information processing apparatus to be the transfer source that is selected, receiving the selected file that is transferred and displaying the selected file on the currently operating information processing apparatus;
   selecting a second information processing apparatus to be a transfer destination out of the plurality of other information processing apparatuses after the displayed selected file is edited to form an edited selected file and in response to an update request for the edited selected file, based on transfer time to transfer the edited selected file from the currently operating information processing apparatus to the plurality of other information processing apparatuses respectively; and
   transferring the edited selected file to the second information processing apparatus to be the transfer destination, and transferring the edited selected file to a third information processing apparatus that stores an update destination file of the edited selected file via the second information processing apparatus to be the transfer destination, such that the update destination file is updated.

13. A file management processing method of managing files in a plurality of information processing apparatuses which are communicably connected via a network, comprising:
   transmitting, in response to a file search request based on a search condition, a file search request based on the search condition from a currently operating information processing apparatus to a plurality of other information processing apparatuses, receiving file information searched by the plurality of other information processing apparatuses respectively, and displaying the file information in a search result on the currently operating information processing apparatus;
   selecting a first information processing apparatus to be a transfer source out of the plurality of other information processing apparatuses that store a same file as a selected file which is selected from the search result;
   requesting transfer of the selected file to the first information processing apparatus to be the transfer source that is selected, receiving the selected file that is transferred and displaying the selected file on the currently operating information processing apparatus;
   selecting a second information processing apparatus to be a transfer destination out of the plurality of other information processing apparatuses after the displayed selected file is edited to form an edited selected file and in response to an update request for the edited selected file, based on transfer time to transfer the edited selected file from the currently operating information processing apparatus to the plurality of other information processing apparatuses respectively; and
   transferring the edited selected file to the second information processing apparatus to be the transfer destination, and transferring the edited selected file to a third information processing apparatus that stores an update destination file of the edited selected file via the second information processing apparatus to be the transfer destination, such that the update destination file is updated.

* * * * *